Feb. 16, 1971 E. A. ROGERS 3,562,908
HAND TOOLS

Filed June 20, 1968 3 Sheets-Sheet 1

INVENTOR
EDWARD A. ROGERS
BY
Wolfe, Hubbard, Voit & Osann
ATTORNEYS

Feb. 16, 1971  E. A. ROGERS  3,562,908
HAND TOOLS

Filed June 20, 1968  3 Sheets-Sheet 2

INVENTOR
EDWARD A. ROGERS
BY
Wolfe, Hubbard, Voit & Osann
ATTORNEYS

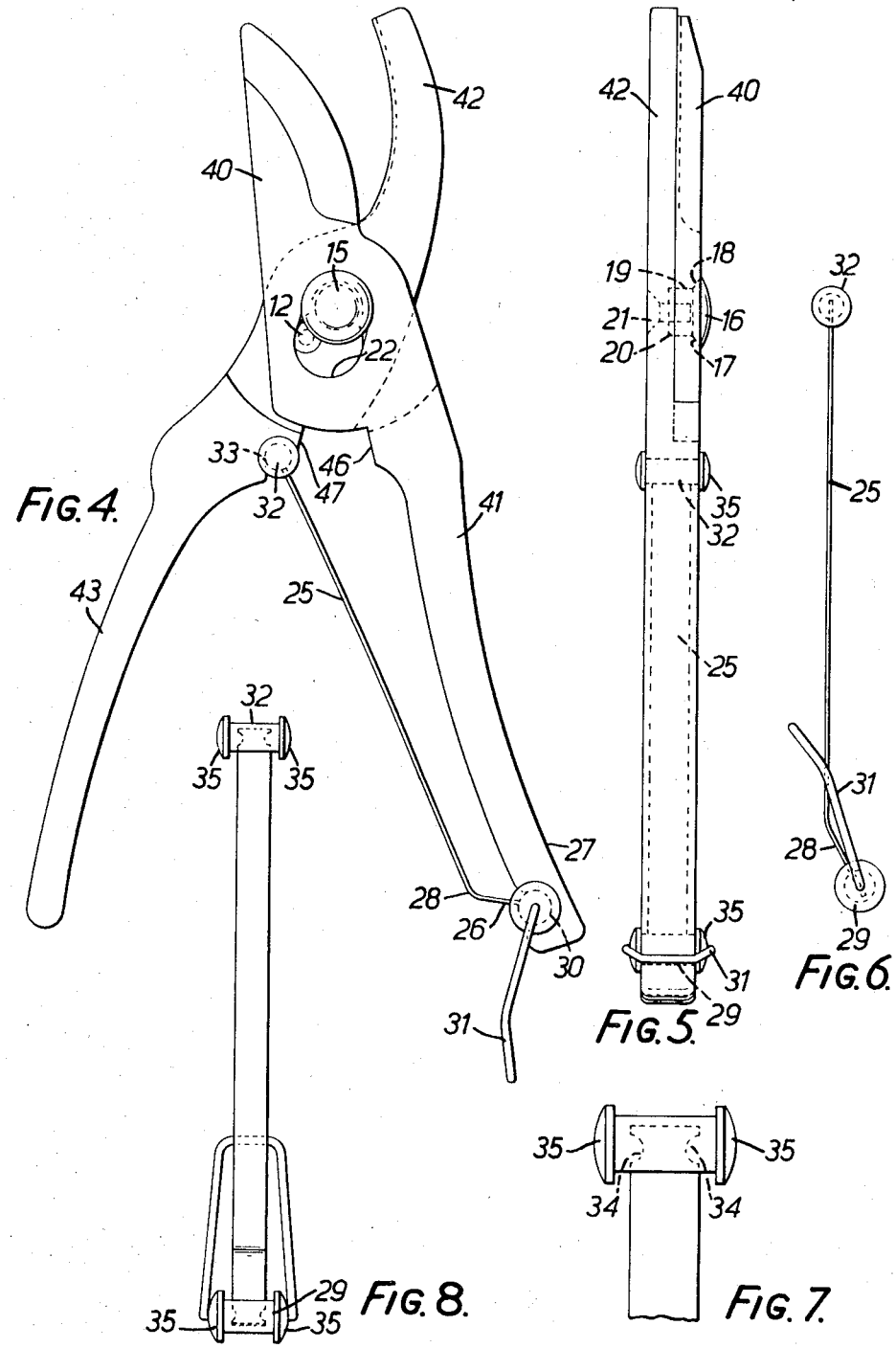

3,562,908
HAND TOOLS
Edward A. Rogers, London, England, assignor to Wilkinson Sword Limited, London, England, a British company
Filed June 20, 1968, Ser. No. 738,484
Claims priority, application Great Britain, June 23, 1967, 28,999/67
Int. Cl. B26b 13/16
U.S. Cl. 30—261                                                    6 Claims

ABSTRACT OF THE DISCLOSURE

A hand tool has two cutter members connected together by a pivot assembly which can readily be rendered inoperative by lateral movement from the pivot axis and withdrawal of the assembly from one of the members by passage of the assembly through a bore of larger diameter than that accommodating the assembly in the operative position. The pivot assembly is biased to the operative position on the pivot axis by a leaf spring having a pivot at each end, the pivots engaging in respective recesses in the handles, one recess being adjacent the pivot assembly and the other remote from the pivot assembly.

BACKGROUND OF THE INVENTION (a) Field of the invention

This invention relates to hand tools comprising two co-operating members which are arranged to be moved towards and away from one another by handles which are coupled to the respective co-operating members.

Whilst of broad application, the invention is particularly applicable to scissor-like tools for kitchen and household use. Other typical applications are to cutting or shearing tools, for example pruners or secateurs, garden shears and metal cutters.

(b) Description of prior art

The provision of a spring biasing the blades of a pair of pruners, secateurs or garden shears apart has already been proposed. It has also been proposed to provide such hand tools with a pivot assembly which has the effect of increasing the force acting on the blades towards one another along the pivot axis thereof in relation to the amount of force required to shear or cut a given article. Such prior proposals require the provision of a spring, but the lasting qualities of such springs is frequently less than desirable because high stress is frequently encountered at the points of attachment to other parts of the hand tool. Stress corrosion is frequently encountered because of the damp conditions commonly encountered when using such tools.

SUMMARY OF THE INVENTION

The required force to bias the operative members of the hand tool apart and also to ensure adequate force holding the operative members together along the pivot axis is provided by an elongate spring carrying a pivot at each end thereof, the pivots engaging in recesses in the handles thus avoiding or at least reducing stresses in the spring at and adjacent the points of attachment.

BRIEF DESCRIPTION OF THE DRAWINGS

Two embodiments of hand tools in accordance with the invention will now be described, by way of example, with reference to the accompanying drawings, in which:

FIG. 4 is a plan view of a second embodiment with the tool open;

FIG. 5 is a side elevation of the second embodiment;

FIG. 6 is a plan view of a part common to both embodiments;

FIG. 7 is a fragmentary side elevation, to an enlarged scale, of a portion of the part shown in FIG. 6; and FIG. 8 is a side elevation of the part shown in FIG. 6.

Figure 1:
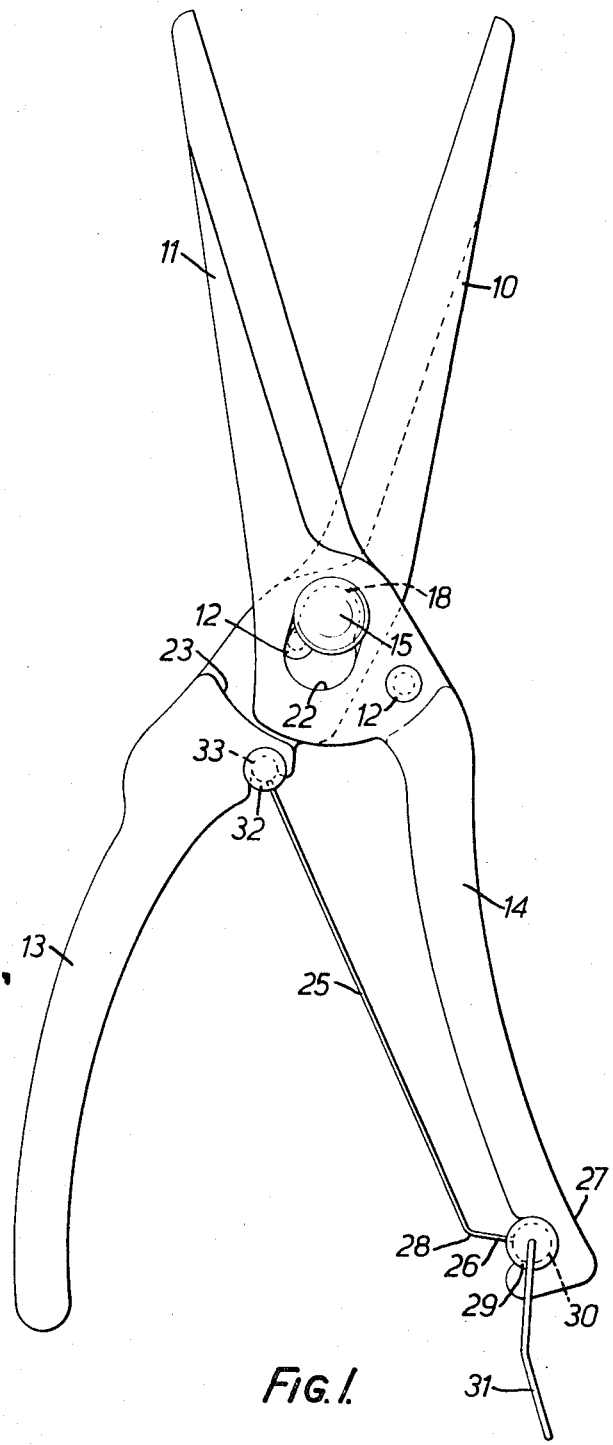
FIG. 1 is a plan view of a first embodiment with the tool open.
Figure 2:
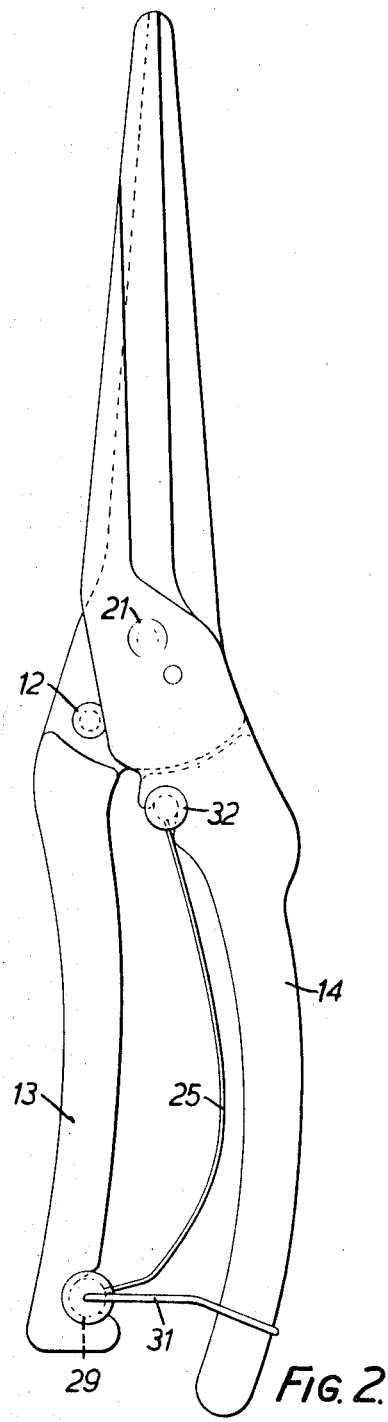
FIG. 2 is an inverted plan view of the first embodiment with the tool closed.
Figure 3:
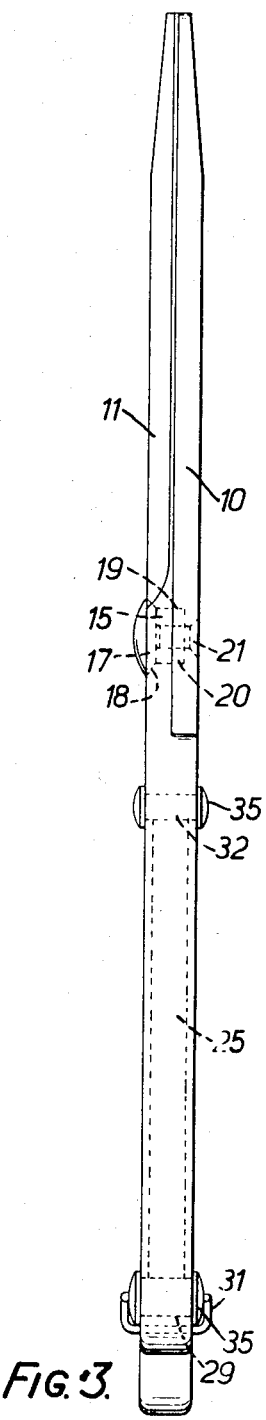
FIG. 3 is a side elevation of the first embodiment.

The first embodiment takes the form of a pair of scissors which can readily be disassembled and are hence particularly useful where cleanliness is of high importance, such as kitchen scissors. The blades 10, 11 or other members are secured, for example by rivets 12 or adhesive, each to a corresponding handle 13, 14.

Each blade 10, 11 has a somewhat greater thickness than conventional blades for an equivalent size of scissor. The blades are slightly curved towards one another as in conventional scissors, but the action of the pivot assembly including a pivot pin 15, to be described hereinafter, is to give interblade pressure related to the load applied. The two assemblies of blades and handles are interconnected by the pivot pin 15 secured rigidly to one assembly and having a slightly domed head 16 with a frusto-conical undersurface 17 which latter engages a complementary surface 18 on the other assembly. This complementary surface extends over an angle of approximately 180° and the inner periphery of surface 18 bounds an aperture 19 of substantially the same diameter as that of the shank 20 of the pin. The pivot pin 15 is secured to the one assembly by a countersunk-headed screw 21 and can be disengaged from the complementary surface 18 by movement of the one assembly away from the blade of the other assembly to an aperture 22 of section corresponding to the diameter of the outer periphery of the head of the pivot pin 15. A part of the assembly 11, 14 is accommodated in a recessed portion 23 of the assembly 10, 13.

In order to prevent inadvertant disassembly of the scissors, the frusto-conical surface 17 of the pivot pin 15 is biassed into contact with the complementary surface 18 of the one assembly by an elongate leaf spring 25 one end 26 of which is connected to an extremity 27 of the handle of the other assembly 11, 14 remote from the blade thereof and the other end of which is connected to the handle of the one assembly at a position adjacent the pivot. The leaf spring 25 has the effect of biassing the blades apart in the sense about the pivot axis and also of maintaining the pivot pin 15 in correct working relationship to its complementary surface 18. The leaf spring 25, when in relaxed condition, is generally straight (FIG. 1) but has a bent-over end portion 28 at one end which is embedded in a pivot in the form of a solid cylindrical member 29 of synthetic resin which engages in a slot 30 of semi-cylindrical cross-section, the dimensions of which allow for a limited pivoting movement of the solid cylindrical member 29, and hence of the spring. The solid cylindrical member 29 also acts as an anchorage for a wire 31 which serves as a closure clip when co-operating with the handle 13 of the said one assembly 10, 13. The end of the leaf spring 25 remote from the clip 31 is likewise embedded in a synthetic-resin cylindrical member 32, which is engaged in a recess or slot 33 adjacent the pivot assembly of the scissors. Each end of the leaf spring preferably has two semi-circular cut-outs 34 thus forming a head which ensures that the spring is properly keyed into the respective cylindrical member 29 or 32. Preferably, the cylindrical member or other pivot has end flanges 35 which are domed outwardly. The cylindrical members may be of moulded polypropylene and therefore require no lubrication. An abutment (not shown) may be provided on each handle 13, 14 to prevent movement of the blades beyond the useful cutting position, i.e. the blades are restrained from crossing over.

In operation, it will be apparent that the leaf spring 25 acts not only to bias the handles 13, 14 and the blades 10, 11 apart to a fully open configuration, but also to bias the pivot pin 15 into the narrower end of its aperture 18. Excessive bending of the leaf spring 25 is prevented adjacent the anchorage points because the cylindrical members 29, 32 can pivot. When the scissors engage a relatively tough article to be cut, there is a tendency for the blades to be forced apart, with the result that the pivot pin 15 tends to ride up the complementary frusto-conical surface 18 and thus provides a reaction force forcing the blades together in a direction parallel with the pivot pin axis.

The second embodiment which is illustrated in FIGS. 4 and 5 takes the form of a pair of secateurs in which a cutting blade 40 is integral with an associated handle 41 and an anvil blade 42 is integral with an associated handle 43. The handle 43 has a recessed portion which accommodates a part of the handle of the other blade 40 and stops 46, 47 are provided on each handle. Otherwise, the construction and arrangement of the spring is the same as in the other embodiment and the same reference numerals have been used for like parts.

I claim:
1. A cutting tool including:
   two co-operating cutting members,
   two handles each rigid with a respective said cutting member,
   a pivot pin rigidly fixed relative to one of said cutting members, said pivot pin having a first bearing surface and said pivot pin serving to connect pivotally the cutting members,
   means defining a second bearing surface on the other of said cutting members, said first bearing surface engaging said second bearing surface and said first and second bearing surfaces each being inclined to the axis of said pivot pin, and said cutting members having limited freedom for movement in a direction at right angles to said pivot pin, and
   an elongate spring pivotally connected at each end to a respective one of said handles to effect relative movement between said bearing surfaces in a direction which effects movement of said cutting members towards one another in a direction parallel to the axis of sid pivot pin.

2. A cutting tool according to claim 1 further comprising:
   two pivots, one said pivot being secured to a respective end of said spring, each said pivot including
   a shank, and
   a flange at each end of the shank, each said handle including a part cylindrical recess having a circumferential extent in excess of 180° and each said shank being engaged in a respective one of said recesses.

3. A cutting tool according to claim 1, wherein said elongate spring is a leaf spring.

4. A cutting tool according to claim 2, wherein said spring comprises:
   a T-shaped portion at each end thereof,
   the T-shaped portions being embedded in the respective pivot.

5. A cutting tool according to claim 2, wherein the pivot engaged in that recess in one handle which is remote from the pivot assembly carries a clip capable of engaging over the other handle to hold the operative members in a closed position.

6. A cutting tool comprising:
   a first cutter blade,
   a second cutter blade,
   a first handle rigid with the first cutter blade to form a first blade assembly and having a part-cylindrical recess therein,
   a second handle rigid with the second cutter blade to form a second blade assembly and having a part-cylindrical recess therein
   a pivot assembly pivotally connecting the first and second blade assemblies and including:
      a pivot pin having a head with a frusto-conical undersurface and a tapped bore in the end thereof remote from the head
      means defining a bore in said one blade assembly about the pivot axis thereof and a semi-annular frusto-conical surface surrounding one end of the bore, said semi-annular frusto-conical surface being complementary to that of the under surface of the pivot pin head,
      means defining a second bore of larger diameter than the first-mentioned bore, disposed laterally thereof and communicating therewith, said second bore having a diameter sufficient to permit passage of the pivot pin head,
      means defining a bore in the second blade assembly about the pivot axis thereof, and
      screw means passing through the bore and engaging in the tapped bore of the pivot pin
   a first cylindrical pivot engaged in the recess of the first handle, said recess being adjacent the pivot assembly and having its axis parallel thereto,
   a second cylindrical pivot engaged in the recess of the second handle, said recess being remote from the pivot assembly and having its axis parallel thereto, and
   an elongate leaf spring the ends of which are engaged respectively in the first and second pivots,
   said leaf spring serving to bias the undersurface of the pivot pin into engagement with the semi-annular frusto-conical surface of the one blade assembly and also to bias the blades and handles apart about the pivot assembly axis.

References Cited
UNITED STATES PATENTS

| | | | |
|---|---|---|---|
| Re. 11,953 | 12/1901 | Hopkins | 30—268 |
| 381,544 | 4/1888 | Garvey | 81—417 |
| 662,468 | 11/1900 | Scheerer | 30—269 |
| 1,423,866 | 7/1922 | Miller | 128—318 |

FOREIGN PATENTS

| | | | |
|---|---|---|---|
| 132,351 | 7/1902 | Germany | 30—269 |

T. E. CONDON, Primary Examiner

J. C. PETERS, Assistant Examiner

U.S. Cl. X.R.

30—269; 81—417; 128—318